Patented Aug. 6, 1940

2,210,327

UNITED STATES PATENT OFFICE 2,210,327

REFRACTORY CEMENT

Norman Percy Pitt, Montreal, Quebec, and Wilfred Gallay, Rockcliffe, Ontario, Canada, assignors, by mesne assignments, to Canadian Refractories Limited, Montreal, Quebec, Canada, a corporation of Canada No Drawing. Application August 19, 1939, Serial No. 291,038

6 Claims. (Cl. 106—9)

This invention relates to cement or mortar for laying up refractory brick and the like, particularly in high temperature furnaces used in metallurgical and other industries where continuity of the refractory surface of the furnace is an important consideration and is a continuation in part of copending application, Serial No. 123,486, filed February 1, 1937.

In furnaces of ordinary construction there is a marked tendency for the molten furnace charge, slag, dust and gas to enter the joint between brick in the furnace structure and this hastens spalling of the brick as well as rupture of the joint with resulting decrease in the useful life of the structure.

One of the most important factors entering into use of cements of the type referred to is the water retentive quality of such cements. Such a cement should have sufficient water retentive property so that, when mixed with water and applied to porous absorbent brick, such as silica brick, the brick can be readily moved into place without sticking. The time required for the cement to dryout sufficiently to prevent movement of the brick without breaking of the cement bond has been designated as "time of grab." A desirable time of grab ordinarily is between 5 and 10 minutes. Too short a time makes the cement exceptionally hard to use when laying brick and too long a time will result in a structure which after construction could be moved out of line by external force by its own weight.

The object of the present invention is to provide a refractory cement of improved workability, which is adapted to completely and uniformly fill the joint between bricks with a minimum thickness of the cement, which has a desirable "time of grab" whereby it will retain its plasticity during application and for a sufficient length of time thereafter to permit the adjustment of brick in position and the expulsion of excess cement, and which retains its workability when applied to porous material like silica brick and without resort to the use of oil or other expedients now used with some types of refractory materials.

In accordance with the invention, a plasticizing agent consisting of an alkali metal carbonate and a partially expanded starch possessing the property that, when suspended in a solution of said alkali metal carbonate, it imparts to the resulting liquid suspension a predetermined viscosity relative to water, is incorporated in finely divided particles of the refractory material of which the cement or mortar is essentially composed.

Sodium carbonate is usually employed as the alkali metal carbonate although potassium carbonate may also be used.

The starch should be in flaked or powdered form and it is important that there be used a properly expanded starch. It is also important that the expanded starch used is such that, when suspended in a solution of the alkali metal carbonate, the resulting liquid suspension has a predetermined minimum viscosity. It has been found that expanded starches, which in suspension in a solution of the alkali carbonate of predetermined proportions impart to the resulting liquid suspension a relative viscosity to water of substantially 20 or more, are satisfactory. Determination of the relative viscosity may be accomplished in the following manner:

Six grams of a starch product are added slowly to 100 c. c. of 4% solution of sodium carbonate ($Na_2CO_3$) with vigorous agitation, which is continued for five minutes at room temperatures. The entire suspension is then disintegrated in a suitable apparatus, for example, a small ball mill, for ten minutes. The bottom point of a 50 c. c. pipette is cut off just above the drawdown portion of the discharge end so as to leave the lower part of the pipette all of the same diameter which is approximately 3 m. m., internal. Within three hours of preparation, the starch suspension is brought to 25° C. and drawn into the pipette to the upper mark and the time of outflow to a mark placed on the lower stem of the pipette noted. The time of flow, as compared with water, is termed the relative viscosity and when this time of flow of a starch product suspension is substantially 20 or more times that of water, the starch product is satisfactory for use in a cement in accordance with the present invention. A dextrine suspension, treated in the manner described, was found to have a relative viscosity of 1 to 1.5 and an ordinary unexpanded starch suspension was found to have a relative viscosity of substantially 1; such starch products are quite unsuitable for employment with the cement of the present invention in that they adversely affect the desirable time of grab.

The refractory employed in the cement may be silica, siliceous material, fire clay, magnesite, chrome ore or the like. The starch preferably comprises not more than 7% of the mass of finely divided refractory material, which may be a mixture of two or more particular materials, and the sodium carbonate or equivalent alkali carbonate preferably not more than 5% of the refractory material. Usually 2 to 4% or so of alkali metal carbonate (anhydrous) is employed, although greater or smaller amounts may be used in particular cases. As a rule not over 5% of sodium carbonate is used because the refractoriness of the cement is adversely affected. The amount of expanded starch used is ordinarily about 3% or so, but greater or smaller amounts may be used in some cases. When amounts of an expanded starch of above substantially 7% are used, the resulting cement or mortar becomes difficult to work and the time of grab becomes excessively long. For use ordinarily water is incorporated with the dry mixed cement to the desired consistency and the wet cement is allowed to stand for upwards of about 15 minutes before using.

Use of this cement or mortar in commercial practice has given decidedly improved results, over those previously available, in increasing the life of the refractory surface of the furnace as well as in relation to facility and expense in laying up the brick. The time of grab of the refractory cement of this invention is within the most desirable limits, for instance, between 5 and 10 minutes, and may in practice be varied by increasing or decreasing the amount of plasticizing agent added. The improved workability of the cement makes it possible to provide a continuous but much thinner layer between adjacent brick. Starch has been used in various arts for its water retaining properties but it is important that, for the purposes of the present invention, a starch of the type described should be employed if the desirable properties of the cement are to be attained. The presence of the alkali carbonate with the starch in the finely divided refractory increases the water-retentive capacity of the starch and with the starch constitutes a plasticizing agent, which, upon addition of water, reacts in situ in the mass to provide the desired result.

The water-retentive properties of cements made as described are of advantage not only in laying up walls, where the complete filling of joints and economy in the use of cement and labor are desirable, but more especially in constructing furnace roofs (usually made of silica brick), where the properties of the improved cements are such as to permit keying in of the arch before the cement has set, thus resulting in a much stronger structure than has heretofore been possible. A further advantage of the cement is that it dries with a strong bond, holding the whole structure rigidly in position.

We claim:

1. As a new article of manufacture, a cement or mortar composition for laying up refractory brick and the like comprising essentially finely divided particles of refractory material and a plasticizing agent consisting of an alkali metal carbonate and dry particles of a partly expanded starch possessing the property that, when six grams of it are intimately suspended and dispersed in 100 c. c. of a 4% solution of said alkali metal carbonate, it imparts to the resulting liquid suspension at 25° C. a viscosity substantially twenty or more times that of water.

2. As a new article of manufacture, a cement or mortar composition for laying up refractory brick and the like comprising essentially finely divided particles of refractory material and a plasticizing agent consisting of substantially 5 parts of sodium carbonate and not more than substantially 7 parts of a partly expanded starch powder possessing the property that, when six grams of it are intimately suspended and dispersed in 100 c. c. of a 4% solution of said sodium carbonate, it imparts to the resulting liquid suspension at 25° C. a viscosity substantially twenty or more times that of water.

3. A cement or mortar as defined in claim 2 wherein the proportion of starch is not more than 7% of the refractory material.

4. As a new article of manufacture, a cement or mortar composition for laying up refractory brick and the like comprising essentially finely divided particles of refractory material and a plasticizing agent consisting of dry particles of partially expanded starch and alkali metal carbonate, said starch being so expanded that when six grams of it are intimately suspended and dispersed in 100 c. c. of a 4% solution of said alkali metal carbonate, it imparts to the resulting liquid suspension at 25° C. a viscosity substantially twenty or more times that of water.

5. A plasticizing agent for incorporating in finely divided material for cement, mortar or the like, consisting of an alkali metal carbonate and dry particles of expanded starch, said starch having the property that, when six grams of it are intimately suspended and dispersed in 100 c. c. of a 4% solution of said alkali metal carbonate, it imparts to the resulting liquid suspension at 25° C. a viscosity substantially twenty or more times that of water.

6. A plasticizing agent as set forth in claim 5 consisting of not more than substantially 5 parts of sodium carbonate and not more than 7 parts of said starch.

NORMAN PERCY PITT.
WILFRED GALLAY.